(12) United States Patent
Tiemann

(10) Patent No.: US 6,786,694 B2
(45) Date of Patent: Sep. 7, 2004

(54) GAS TURBINE AND METHOD OF OPERATING A GAS TURBINE

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 83 days.

(21) Appl. No.: 10/214,759

(22) Filed: Aug. 9, 2002

(65) Prior Publication Data

US 2003/0035717 A1 Feb. 20, 2003

(30) Foreign Application Priority Data

Aug. 9, 2001 (EP) .............................. 01119261

(51) Int. Cl.$^7$ ................................. F04D 31/00
(52) U.S. Cl. ........................................ 415/1; 415/116
(58) Field of Search ........................ 415/1, 115, 116; 416/95, 96 R, 97 R

(56) References Cited

U.S. PATENT DOCUMENTS

| | | | |
|---|---|---|---|
| 3,446,482 A | 5/1969 | Kydd | |
| 4,330,235 A | * 5/1982 | Araki | ............... 416/96 R |
| 4,338,780 A | 7/1982 | Sakamoto | |
| 4,614,083 A | 9/1986 | Teshima | |
| 5,758,487 A | 6/1998 | Salt | |
| 5,782,076 A | * 7/1998 | Huber et al. | ............... 60/782 |
| 6,019,579 A | 2/2000 | Kukuno | |
| 6,065,282 A | 5/2000 | Fukue | |
| 6,065,931 A | 5/2000 | Suenaga | |

FOREIGN PATENT DOCUMENTS

| | | |
|---|---|---|
| JP | 59 160032 | 1/1985 |
| JP | 59 160034 | 1/1985 |
| JP | 08 284687 | 10/1996 |
| JP | 09 060531 | 3/1997 |
| JP | 09 060531 | 7/1997 |

\* cited by examiner

*Primary Examiner*—Edward K. Look
*Assistant Examiner*—Kimya N. McCoy
(74) *Attorney, Agent, or Firm*—Harness, Dickey & Pierce, P.L.C.

(57) ABSTRACT

In a gas turbine, having a number of turbine blades/vanes respectively combined to form blade/vane rows, each of the turbine blades/vanes including an integrated cooling air duct, the cooling air requirement is to be kept particularly low in conjunction with reliable cooling of the turbine blades/vanes. For this purpose, the turbine blades/vanes forming a first turbine blade/vane row and the turbine blades/vanes forming a second blade/vane row connected downstream thereof, viewed in the flow direction of the working medium, are connected one behind the other on the cooling air side with the intermediate connection of an injection device for water. During the operation of the gas turbine, the cooling air flowing out of the turbine blades/vanes forming the first blade/vane row is intercooled by the injection of water and is subsequently supplied to the cooling air ducts of the turbine blades/vanes forming the second blade/vane row.

18 Claims, 2 Drawing Sheets

GAS TURBINE AND METHOD OF OPERATING A GAS TURBINE

This application claims priority under 35 U.S.C. §119 on European Application No. EP 01119261.4 which has a filing date of Aug. 9, 2001, the entire contents of which are hereby incorporated by reference.

FIELD OF THE INVENTION

The invention generally relates to a gas turbine, having a number of turbine blades/vanes respectively combined to form blade/vane rows. Preferably, each of the turbine blades/vanes has an integrated cooling air duct. It also generally relates to a method of operating a gas turbine.

BACKGROUND OF THE INVENTION

Gas turbines are employed in many fields for driving generators or machinery. In this process, the energy content of a fuel is used to generate a rotational motion of a turbine shaft. For this purpose, the fuel is burnt in a combustion chamber, with compressed air being supplied from an air compressor. The working medium at high pressure and at high temperature generated in the combustion chamber by the combustion of the fuel is conducted, in this process, via a turbine unit connected downstream of the combustion chamber, where the gas expands with an output of work.

In order to generate the rotational motion of the turbine shaft in this process, a number of rotor blades, which are usually combined into blade groups or blade rows, are arranged on this turbine shaft and these rotor blades drive the turbine shaft by means of a transfer of inertia from the flow medium. In order to conduct the flow medium within the turbine unit, furthermore, guide vane rows connected to the turbine casing are usually arranged between adjacent rotor blade rows.

In the design of such gas turbines, a usual design objective—in addition to the achievable power—is a particularly high efficiency. For thermodynamic reasons, an increase in the efficiency can fundamentally be obtained by increasing the outlet temperature at which the working medium flows out of the combustion chamber and into the turbine unit. In consequence, temperatures of approximately 1200° C. to 1300° C. are an objective for such gas turbines and are also achieved.

In the case of such high temperatures of the working medium, however, the components and structural parts exposed to this working medium are subjected to high thermal stresses. In order, nevertheless, to ensure a comparatively long life of the components affected whole maintaining a high level of reliability, cooling is usually provided for the components affected, in particular for the rotor blades and/or guide vanes of the turbine unit. The turbine blades/vanes are therefore usually designed so that they can be cooled, it being particularly necessary to ensure an effective and reliable cooling of the first blade/vane rows, viewed in the flow direction of the working medium. For cooling purposes, the respective blade/vane in this arrangement usually has a coolant duct, which is integrated into the blade/vane aerofoil or the blade/vane profile and from which a coolant can be specifically conducted to the thermally stressed zones, in particular, of the turbine blade/vane.

In this arrangement, cooling air is usually employed as the coolant. This cooling air is usually supplied to the respective turbine blade/vane, in the manner of an open cooling system, via an integrated coolant duct. After emerging from the latter, the cooling air flows, in branch ducts, through the respectively provided regions of the turbine blade/vane. At the outlet end, these ducts are left open so that, after flowing through the turbine blade/vane, the cooling air emerges from the latter and, in the process, mixes with the working medium conducted in the turbine unit.

In this way, it is possible to make a reliable cooling system for the turbine blade/vane available with comparatively simple means, it being also possible to admit coolant, in an appropriate manner, to thermally particularly stressed zones of the turbine blade/vane. With respect to the introduction of the cooling air into the working medium conducted in the turbine unit, on the other hand, it is however necessary to pay attention to ensuring that its characteristic parameters, such as pressure and temperature, are consistent with or are compatible with the corresponding parameters of the working medium. In particular, only limited heating of the cooling air is permissible during the cooling of the turbine blades/vanes so that, precisely in the case where comparatively high outlet temperatures are desired for the working medium, a particularly large quantity of cooling air is necessary. This, in turn, has the effect of limiting the efficiency of the gas turbine.

An economy in the cooling air requirements, which is desirable for these reasons, can be achieved by configuring the cooling system as a closed cooling system. In a closed cooling system of this type, the used cooling air is returned to the combustion process. Particularly in the case of such a closed cooling system, however, in which the cooling air can be subject to a comparatively high pressure loss, it is usually necessary to provide cooling air which is matched to the location and requirement and has a comparatively high pressure, which depends on the injection location provided. In this arrangement, the pressure loss in the conduction of the cooling air through a closed system has inter alia also to be taken into account. Precisely in the case of comparatively long, extended systems, the pressure loss can contribute to a substantial extent to the requirements with respect to the cooling air which has to be provided. Precisely the provision of cooling air with comparatively high pressure does, however, involve a comparatively complicated design of the associated systems; particularly in the case of high pressure requirements, the cooling air compressor necessary for providing the cooling air can, depending on the operating conditions, partially or indeed completely counterbalance the efficiency and power advantages attainable due to the closed cooling system.

SUMMARY OF THE INVENTION

An embodiment of the invention is therefore based on an object of providing a gas turbine in which, while maintaining reliable cooling of the turbine blades/vanes, the cooling air requirement is kept particularly low. In addition, a particularly suitable method for operating such a gas turbine with a comparatively small cooling air requirement overall is to be provided.

With respect to the gas turbine, an object may be achieved, according to an embodiment of the invention, by the turbine blades/vanes forming a first turbine blade/vane row and the turbine blades/vanes forming a second blade/vane row connected downstream of the first blade/vane row, viewed in the flow direction of the working medium, being connected one behind the other on the cooling air side with the intermediate connection of an injection device for water.

An embodiment of the invention then takes into consideration that the cooling air requirement for reliable cooling of the turbine blades/vanes can be kept particularly small by employing the cooling air to a particularly intensive extent for cooling the turbine blades/vanes. With respect to the necessary operating pressure of the cooling air, this is, in particular, possible in the case of the cooling air which has to be made available at a comparatively high pressure in any case for the turbine blade/vane rows located comparatively far forward, viewed in the flow direction of the working medium. The cooling air for these turbine blade/vane rows has to be made available, for operational reasons, at such a high pressure that this pressure level is sufficient for conducting cooling air over a plurality of turbine blades/vanes or blade/vane rows connected on the cooling air side in sequence, even taking account of comparatively high pressure losses when cooling the blades/vanes.

In order to utilize this pressure potential, provision is made for employing the still available pressure of the cooling air flowing out of the first blade/vane row, which has now been cooled, for feeding the second blade/vane row which still has to be cooled. In this arrangement, however, it is necessary to take account of the fact that the cooling air flowing out of the first blade/vane row has been heated by the cooling of the first blade/vane row. In order, nevertheless, to be able to employ this cooling air to cool the second blade/vane row also, intercooling of the cooling air is provided before its entry into the second blade/vane row. For this purpose, while maintaining the pressure of the cooling air, its temperature is reduced in such a way that a renewed use of the cooling air in the next blade/vane row is made possible. In this arrangement, the intercooling takes place by injecting water, the outlets of the cooling air ducts of the turbine blades/vanes forming the first blade/vane row, viewed in the flow direction of the working medium, being connected, with the intermediate connection of an injection device for water, to the inlets of the cooling air ducts of the turbine blades/vanes forming the blade/ vane row which is next in order, viewed in the flow direction of the working medium.

Advantageously, such multiple utilization of the cooling air is provided for the cooling of guide vanes of the gas turbine. For this purpose, the first and the second blade/vane rows are respectively formed as a guide vane row by a number of guide vanes connected to a turbine casing of the gas turbine. In this arrangement, the cooling air conduction between the guide vane rows expediently takes place by means of a duct system integrated in the turbine casing, the water injection being also arranged in the turbine casing.

In an alternative or additional advantageous further development, such a multiple utilization of the cooling air is, however, also provided for rotor blade rows of the gas turbine. For this purpose, the first and the second blade/vane rows are expediently and respectively formed by a number of rotor blades arranged on a turbine shaft of the gas turbine. In this case, the duct system for conducting the cooling air is expediently integrated in the turbine shaft.

In a particularly advantageous embodiment, such multiple utilization is provided both for the cooling air for the rotor blades of the gas turbine and for the cooling air for the guide vanes of the gas turbine. For this purpose, in a particularly advantageous further development, both the rotor blade rows following one another, viewed in the flow direction of the working medium, and the guide vane rows following one another, viewed in the flow direction of the working medium, are connected one behind the other, on the cooling air side, in each case with the intermediate connection of an associated injection device for water.

Between the blade/vane rows which are connected one behind the other in this manner on the coolant side, the cooling air is essentially conducted in the manner of a closed cooling system. In order to permit, with certainty, reliable cooling of particularly critical regions of individual blades/vanes also, however, provision is advantageously made for releasing some of the cooling air, to suit the requirement, in the manner of an open cooling system in particularly affected regions of individual turbine blades/vanes or of all the turbine blades/vanes. For this purpose, a number of the turbine blades/vanes expediently have a number of cooling air outlets in the region of the rear edge, viewed in the flow direction of the working medium, of their blade/vane aerofoils. With respect also to the pressure level of the cooling air conducted within the turbine blades/vanes, this is readily possible precisely for the turbine blades/vanes arranged comparatively for toward the rear, viewed in the flow direction of the working medium, because the pressure drop in the flow duct of the working medium of the gas turbine can be up to 12 bar and is therefore greater, in the case of turbine blades/vanes which are connected one behind the other on the coolant side, than the pressure loss in the cooling air duct itself.

With respect to an embodiment of the method, an object may be achieved by the cooling air flowing out of the turbine blades/vanes which form the first blade/vane row being intercooled by the injection of water and being subsequently supplied to the cooling air ducts of the turbine blades/vanes forming the second blade/vane row.

Such a concept of cooling designed for an essentially closed cooling system can be advantageously combined with an open cooling system, which is matched to the requirement, for regions of the turbine blades/vanes which are particularly subjected to thermal effects. For this purpose, a partial flow of the cooling air flowing through a turbine blade/vane is expediently branched off within the latter and is mixed into the working medium by a number of cooling air outlets arranged in the region of the rear edge, viewed in the flow direction of the working medium, of its blade/vane aerofoil.

The advantages achieved can include, in particular, the fact that due to the connection, one behind the other on the cooling air side, of a plurality of turbine blades with intercooling of the cooling air by the injection of water, a particularly effective utilization is made possible for the cooling air, which has to be made available at a comparatively high pressure in any case for the blade/vane rows located comparatively far forward, viewed in the flow direction of the working medium. Such a high-pressure and therefore comparatively "high-value" cooling air can, in this arrangement, be subjected to multiple utilization so that the cooling air consumption is kept particularly small overall. Because of this, provision of separately compressed cooling air is not, in particular, necessary for blade/vane rows located comparatively further to the rear.

Such a multiple use of the cooling air can be provided for only two or also for three or more blade/vane rows following one another, viewed in the flow direction of the working medium. The multiple use of the cooling air, while utilizing the pressure still also available in the cooling air flowing out of the first blade/vane row is, in particular, made possible because a pressure drop of approximately 12 bar exists overall along the flow duct of the working medium within the gas turbine.

Due to the release, to suit the requirement, of a partial quantity of the cooling air in order to feed, in the manner of an open cooling system, comparatively severely thermally affected regions of individual turbine blades/vanes, an essentially per se closed but overall open air cooling system results, in which only the cooling air consumption in the first blade/vane row occurs, whereas the system dispenses with the additional consumption of cooling air in the following blade/vane rows.

BRIEF DESCRIPTION OF THE DRAWINGS

An exemplary embodiment of the invention is explained in more detail using the drawings. In this.

Similar parts in the two figures are provided with the same designations.

DETAILED DESCRIPTION OF THE PREFERRED EMBODIMENTS

Figure 1:
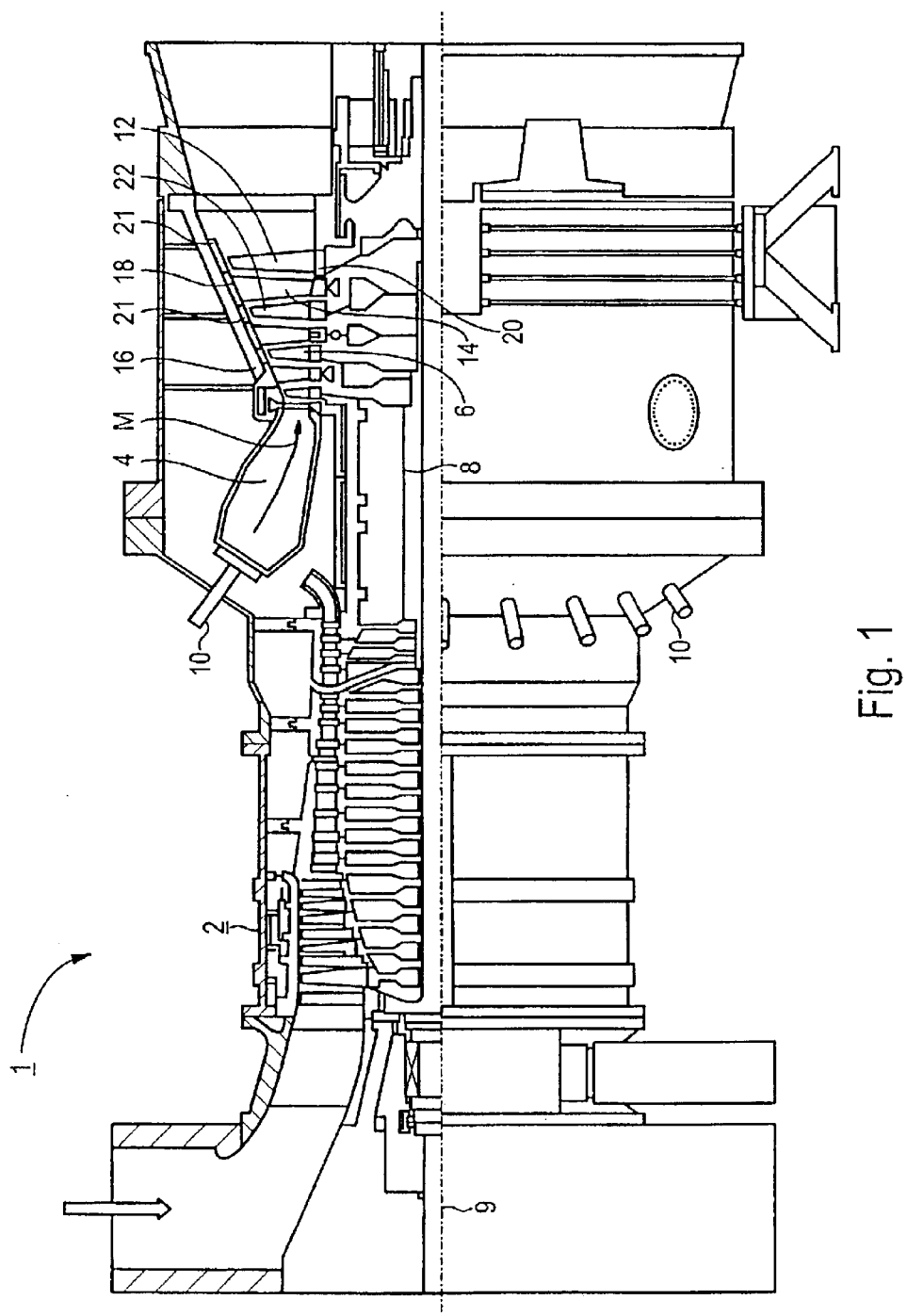
FIG. 1 shows a half-section through a gas turbine.

The gas turbine 1 of FIG. 1 has a compressor 2 for combustion air, a combustion chamber 4 and a turbine 6 for driving the compressor 2 and a generator or a power machine (not shown). For this purpose, the turbine 6 and the compressor 2 are arranged on a common turbine shaft 8, also designated a turbine rotor, to which the generator or the power machine is also connected and which is rotatably supported about its center line 9.

The combustion chamber 4 is equipped with a number of burners 10 for the combustion of a liquid or gaseous fuel. It is, in addition, provided with heat-shield elements (not shown in any more detail) on its inner wall.

The turbine 6 has a number of rotor blades 12, which can rotate and which are connected to the turbine shaft 8. The rotor blades 12 are arranged as a ring on the turbine shaft 8 and therefore form a number of rotor blade rows. The turbine 6 also comprises a number of stationary guide vanes 14, which are likewise fastened as rings with the formation of guide vane rows on an inner casing 16 of the turbine 6. In this arrangement, the rotor blades 12 are used for driving the turbine shaft 8 by use of a transfer of inertia from the working medium M flowing through the turbine 6. The guide vanes 14, on the other hand, are used for conducting the flow of the working medium M between each two rotor blade rows or rotor blade rings, which follow one another viewed in the flow direction of the working medium M. A sequential pair consisting of a ring of guide vanes 14, or a guide vane row, and of a ring of rotor blades 12, or a rotor blade row, is also designated a turbine stage in this arrangement.

Each guide vane 14 has a platform 18, which is also designated a vane root and which is arranged for fixing the respective guide vane 14 as a wall element on the inner casing 16 of the turbine 6. In this arrangement, the platform 18 is a thermally comparatively strongly stressed component, which forms the outer boundary of a hot gas duct for the working medium M flowing through the turbine 6. Each rotor blade 12 is fastened, in an analogous manner, by a platform 20, also designated as a blade root, to the turbine shaft 8.

A guide ring 21 is respectively arranged on the inner casing 16 of the turbine 6 between the platforms 18, which are arranged at a distance from one another, of the guide vanes 14 of two adjacent guide vane rows. The outer surface of each guide vane ring 19 is likewise, in this arrangement, exposed to the hot working medium M flowing through the turbine 6 and is at a distance in the radial direction, by a gap, from the outer end 22 of the rotor blade 12 located opposite to it. The guide rings 21 arranged between adjacent guide vane rows are, in this arrangement, used in particular as cover elements, which protect the inner wall 16 or other casing installation parts from an excessive thermal stress due to the hot working medium M flowing through the turbine 6.

Figure 2:
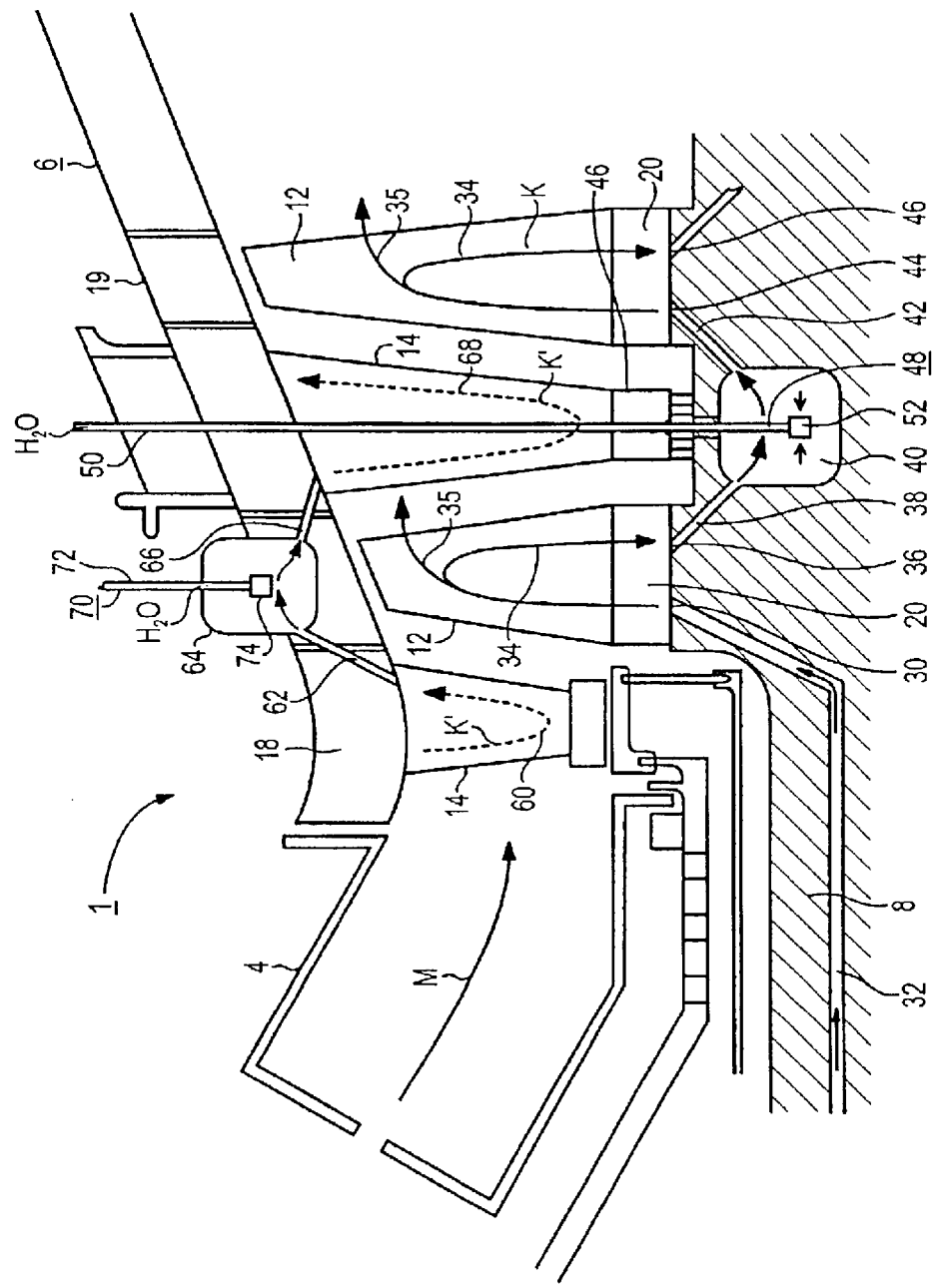
FIG. 2 shows an excerpt from a longitudinal section of the gas turbine of FIG. 1, with representation of cooling ducts.

In order to achieve a comparatively high efficiency, the gas turbine 1 is designed for a comparatively high outlet temperature, of approximately 1200° C. to 1300° C., of the working medium M emerging from the combustion chamber 4. In order to make this possible, at least some of the rotor blades 12 and the guide vanes 14 are designed so that they can be cooled by cooling air as the cooling medium. In order to make the flow path of the cooling air clear, the region of the gas turbine 1 immediately following the combustion chamber 4 is shown enlarged, as an excerpt, in FIG. 2. From this it can be seen that the working medium M flowing out of the combustion chamber 4 first meets a number of guide vanes 14, which form the so-called first guide vane row and which are secured in the combustion chamber 4 by their respective platforms 18. Following them viewed in the flow direction of the working medium M are the rotor blades 12, forming the first rotor blade row, the guide vanes 14 forming the second guide vane row and the rotor blades 12 forming the second rotor blade row.

In order to permit a particularly high efficiency of the gas turbine 1, the rotor blades 12 forming the first rotor blade row and the second rotor blade row and the guide vanes 14 forming the first guide vane row and the second guide vane row, at least, are designed for an essentially closed air cooling system, i.e. for a controlled removal of "used" cooling air K. In order to keep the requirement for cooling air K particularly low overall in this arrangement, both the rotor blade rows and the guide vane rows are connected in sequence on the cooling air side in respectively separated cooling air systems.

For this purpose, each of the rotor blades 12 forming the first rotor blade row has, on the one hand, a respective inlet 30 for cooling air K, as the cooling medium, in its platform 20 forming its blade root. In this arrangement, the inlet 30 is connected to an integrated duct system 32, which is routed within the turbine shaft 8 and by which the respective inlet 30 can be fed with cooling air K. Within the respective rotor blade 12, a coolant duct (not shown in any more detail), in particular in the form of a meander, is arranged and this is in connection with the inlet 30. In order to form a flow path, indicated by the arrow 34, for the cooling air K, the coolant duct in this arrangement is routed in the form of a meander in such a way that essentially all the space regions of the respective rotor blade 12 can be adequately cooled. In addition, a partial duct system, indicated by the arrow 35, branches off from the coolant duct and by means of this, a partial quantity of the cooling air K can be released from the respective rotor blade 12 in the manner of an open cooling system. By this partial quantity of the cooling air K, which quantity is kept comparatively small, reliable cooling occurs of thermally comparatively highly stressed regions of the respective rotor blade 12.

On the other hand, the actual coolant duct integrated into the respective rotor blade 12 opens at the outlet end, in the manner of an essentially closed cooling system into an outlet 36 likewise arranged in the region of the platform 20 and the turbine shaft 8. The outlets 36 of the rotor blades 12 forming the first rotor blade row, viewed in the flow direction of the working medium M, communicate via a respectively associated outlet flow duct 38 with a common plenum chamber 40, which is integrated into the turbine shaft 8 and into which the cooling air K flowing out of the first rotor blade row passes. Viewed in the longitudinal direction of the turbine shaft 8, the plenum chamber 40 is arranged, in this arrangement, in the region of the second guide vane row. Because of the comparatively high pressure with which the cooling air K was fed into the first rotor blade row, the cooling air K flowing out of the first rotor blade row also is still at a comparatively high pressure. In order to utilize this pressure level in a profitable manner, further use of the cooling air K, which arises in the plenum chamber 40 and actually "used" in the first rotor blade row, is provided for the cooling of the rotor blades 12 which form the second rotor blade row, viewed in the flow direction of the working medium M.

For this purpose, the plenum chamber 40 communicates in turn, by means of a respectively associated inlet flow duct 42, with an inlet 44 for cooling air K of each of the guide vanes 12 forming the second rotor blade row. In this arrangement, the inlet 44 is likewise arranged in the platform 20 forming the blade root of a respective rotor blade 12. In addition, the inlet 44 is likewise in connection with a coolant duct, which is arranged within the respective rotor blades 12 and is likewise not shown in any more detail. In the rotor blades 12 forming the second rotor blade row also, the coolant duct is routed in the form of a meander in each case, so that essentially all the space regions of the respective rotor blade 12 can be adequately cooled, as is also indicated here by the arrow 34. In the case of these rotor blades 12 also, as is represented by the arrow 35, a partial release of a partial flow of the cooling air K is provided, as required, in the manner of an open coolant system in the region of thermally particularly stressed zones. The respective cooling system duct of the rotor blades 12 forming the second rotor blade row opens, at the outlet end, into an outlet 46 likewise arranged in the region of the platform 20 and the turbine shaft 8. Depending on the design, this outlet 46 can communicate with a further plenum chamber or can also open into a discharge system for used cooling air K.

The rotor blades 12 forming the first rotor blade row, viewed in the flow direction of the working medium M, and the rotor blades 12 forming the downstream or second rotor blade row, viewed in the flow direction of the working medium M, are therefore connected in series on the cooling air side. This permits a further utilization of the cooling air K flowing out of the first rotor blade row for the cooling of the second rotor blade row, especially since the pressure level of the cooling air K flowing out of the first rotor blade row is easily sufficient for conduction of the cooling air K through the second rotor blade row. The cooling air K does, however, experience heating in the first rotor blade row due to the cooling of the latter. In order to make the cooling air K flowing out of the first rotor blade row usable for further cooling, namely a cooling of the second rotor blade row, intermediate cooling of the cooling air K is provided in the plenum chamber 40.

For this purpose, the plenum chamber 40 is provided with an injection device 48 for water $H_2O$. In this arrangement, the injection device 48 comprises a supply line 50 connected, in a manner not shown in any more detail, to a water supply, which supply line 50 is routed from a region outside of the turbine casing 6 through a guide vane 14 which is opposite to the plenum chamber 40 into the plenum chamber 40. At its outlet end, the supply line 50 has a nozzle head 52 and, by its outlet-end holes, water $H_2O$ conducted in the supply line 50 can be injected into the plenum chamber 40. The injection of the water $H_2O$ into the plenum chamber 40 therefore permits recooling of the cooling air K flowing out of the first rotor blade row, so that this cooling air K can enter the second rotor blade row with a sufficiently low temperature for cooling the second rotor blade row.

In an analogous manner, a multiple utilization of the cooling air K' is also provided for the guide vanes 14 of the gas turbine 1. For this purpose, the guide vanes 14 forming the first guide vane row, viewed in the flow direction of the working medium M, are respectively provided with an inlet duct (not shown in any more detail) for cooling air K', this inlet duct leading through the guide vanes' respective platform 18. A coolant duct not shown in any more detail and, in particular, in the form of a meander, which is in connection with the respective supply duct, is arranged in each of the guide vanes 14 forming the first guide vane row. In order to form a flow path, indicated by the dashed arrow 60, for the cooling air K', the coolant duct is routed, in the form of a meander, in such a way that all the space regions of the respective guide vanes 14 can be adequately cooled. In this arrangement, the respective coolant duct opens at the outlet end into a cooling air duct 62, likewise arranged in the platform 18.

The cooling air ducts 62 of the guide vanes 14 forming the first guide vane row open, at the outlet end, into an annular plenum chamber 64 arranged in the turbine casing 6. Supply ducts 66 for cooling air K', of which each respectively opens into one of the guide vanes 14 forming the second guide vane row, viewed in the flow direction of the working medium M, start from this plenum chamber 64. Each of these guide vanes 14 likewise has an integrated coolant duct (not shown in any more detail) in the form of a meander so that again a flow path indicated by the dashed arrows 68 is provided in the respective guide vane 14. At the outlet end, the cooling air K' flowing out of the guide vanes 14 forming the second guide vane row is suitably conducted away, in a manner not shown in any more detail.

In order to permit such multiple utilization of the cooling air K' in the case of the guide vanes 14 also, intercooling of the cooling air K' is likewise provided in the plenum chamber 64. For this purpose, the plenum chamber 64 is also provided with an injection device 70 for water $H_2O$. This comprises a supply line 72 also connected to the water supply (not shown in any more detail), the outlet end of which supply line 72, with an end provided with a nozzle head 74, is arranged within the plenum chamber 64.

During operation of the gas turbine 1, both the rotor blades 12 and the guide vanes 14 have to cooling air K or K' respectively admitted to them in a suitable manner. In this arrangement, the first rotor blade row and guide vane row, viewed in the flow direction of the working medium M, have "fresh" cooling air K or K'—which, for operational reasons, is at a comparatively high pressure—respectively admitted to them. After flowing out of the respective first blade/vane row, the "used" and partially heated cooling air K or K' still has a comparatively high pressure level. In order to utilize this pressure level so as to increase the efficiency and output of the gas turbine 1, a further use of the cooling air K and K' takes place in a respectively downstream rotor blade row and/or guide vane row. In order to permit this, a reduction of the temperature level of the already used cooling air K or K' to a temperature level suitable for further cooling purposes is provided. For this purpose, an injection of water $H_2O$ takes place into the respective plenum chamber 40 or 64 and this effects intercooling of the respective cooling air K or K'. The cooling air K, K' intercooled in this way is then supplied to the coolant ducts of the rotor blades 12 and guide vanes 14 forming the respectively downstream blade/vane row, viewed in the flow direction of the working medium M. Such multiple utilization of the cooling air K, K' dispenses with the necessity of a separate feed to the respectively downstream blade/vane row with cooling air K or K'. This permits a reliable cooling of the rotor blades 12 and the guide vanes 14 with only a small consumption of cooling air.

In order to ensure, in this per se closed cooling system, a particularly intensive cooling, to meet the requirements, of comparatively strongly stressed zones, a partial quantity of the cooling air K or K' conducted in the rotor blades 12 and/or in the guide vanes 14 is additionally branched off there, to meet the requirement, and is led out in the manner of an open partial cooling system at the rear edge, viewed in the flow direction of the working medium M, of the blade/vane aerofoil of the respective rotor blades 12 or of the respective guide vane 14 and is mixed with the working medium M.

| List of designations | |
|---|---|
| 1 | Gas turbine |
| 2 | Compressor |
| 4 | Combustion chamber |
| 6 | Turbine casing |
| 8 | Turbine shaft |
| 9 | Center line |
| 10 | Burner |
| 12 | Rotor blades |
| 14 | Guide vanes |
| 16 | Inner wall |
| 18 | Platform |
| 20 | Platform |
| 21 | Guide ring |
| 22 | End |
| 30 | Inlet |
| 32 | Duct system |
| 34, 35 | Arrows |
| 36 | Outlet |
| 38 | Outlet flow duct |
| 40 | Plenum chamber |
| 42 | Inlet flow duct |
| 44 | Inlet |
| 46 | Outlet |
| 48 | Injection device |
| 49 | Lamellar seal |
| 50 | Supply line |
| 51 | Exhaust air chamber |
| 60 | Dashed arrow |
| 62 | Cooling air duct |
| 64 | Plenum chamber |
| 66 | Supply ducts |
| 68 | Dashed arrow |
| 70 | Injection device |
| 72 | Supply line |
| 74 | Nozzle head |
| K, K' | Cooling air |
| M | Working medium |
| H$_2$O | Water |

The invention being thus described, it will be obvious that the same may be varied in y ways. Such variations are not to be regarded as a departure from the spirit and scope of invention, and all such modifications as would be obvious to one skilled in the art are intended to be included within the scope of the following claims.

What is claimed is:

1. A gas turbine, comprising:
   a plurality of turbine blades/vanes respectively combined to form blade/vane rows, each turbine blade/vane including an integrated cooling air duct;
   wherein the cooling air ducts of the turbine blades/vanes forming a first turbine blade/vane row and the cooling air ducts of the turbine blades/vanes forming a second blade/vane row, which is downstream from the first turbine blade/vane row in a flow direction of a working medium, are connected together by an intermediate connection having an injection device for water.

2. The gas turbine as claimed in claim 1, wherein the first and the second blade/vane rows are respectively formed as a guide vane row by a plurality of guide vanes connected to a turbine casing.

3. The gas turbine as claimed in claim 2, wherein a number of the turbine blades/vanes have a number of cooling air outlets in a region of a rear edge, relative to the flow direction of the working medium, of a blade/vane aerofoil.

4. A method of operating a gas turbine as claimed in claim 2, comprising:
   intercooling the cooling air, flowing out of the turbine blades/vanes forming the first blade/vane row, by the injection of water, and
   supplying the intercooled water to the cooling air ducts of the turbine blades/vanes forming the second blade/vane row.

5. The method as claimed in claim 4, wherein, within a turbine blade/vane, a partial flow of the cooling air is branched off and mixed into the working medium by a number of cooling air outlets arranged in a region of a rear edge, relative to the flow direction of the working medium, of a blade/vane aerofoil.

6. The gas turbine as claimed in claim 1, wherein the first and the second blade/vane rows are respectively formed as a rotor blade row by a number of rotor blades arranged on a turbine shaft.

7. The gas turbine as claimed in claim 6, wherein both rotor blade rows following one another in the flow direction of the working medium, and guide vane rows following one another in the flow direction of the working medium have cooling air ducts that are respectively connected together by the intermediate connection having an associated injection device for water.

8. The gas turbine as claimed in claim 7, wherein a number of the turbine blades/vanes have a number of cooling air outlets in a region of a rear edge, relative to the flow direction of the working medium, of a blade/vane aerofoil.

9. A method of operating a gas turbine as claimed in claim 7, comprising:
   intercooling the cooling air, flowing out of the turbine blades/vanes forming the first blade/vane row, by the injection of water, and
   supplying the intercooled water to the cooling air ducts of the turbine blades/vanes forming the second blade/vane row.

10. The method as claimed in claim 9, wherein, within a turbine blade/vane, a partial flow of the cooling air is branched off and mixed into the working medium by a number of cooling air outlets arranged in a region of a rear edge, relative to the flow direction of the working medium, of a blade/vane aerofoil.

11. The gas turbine as claimed in claim 6, wherein a number of the turbine blades/vanes have a number of cooling air outlets in a region of a rear edge, relative to the flow direction of the working medium, of a blade/vane aerofoil.

12. A method of operating a gas turbine as claimed in claim 6, comprising:
   intercooling the cooling air, flowing out of the turbine blades/vanes forming the first blade/vane row, by the injection of water, and supplying the intercooled water to the cooling air ducts of the turbine blades/vanes forming the second blade/vane row.

13. The method as claimed in claim 12, wherein, within a turbine blade/vane, a partial flow of the cooling air is branched off and mixed into the working medium by a number of cooling air outlets arranged in a region of a rear edge, relative to the flow direction of the working medium, of a blade/vane aerofoil.

14. The gas turbine as claimed in claim 1, wherein a number of the turbine blades/vanes have a number of cooling air outlets in a region of a rear edge, relative to the flow direction of the working medium, of a blade/vane aerofoil.

15. A method of operating a gas turbine as claimed in claim 14, comprising:

intercooling the cooling air, flowing out of the turbine blades/vanes forming the first blade/vane row, by the injection of water, and supplying the intercooled water to the cooling air ducts of the turbine blades/varies forming the second blade/vane row.

16. The method as claimed in claim 15, wherein, within a turbine blade/vane, a partial flow of the cooling air is branched off and mixed into the working medium by the cooling air outlets.

17. A method of operating a gas turbine as claimed in claim 1, comprising:

intercooling the cooling air, flowing out of the turbine blades/vanes forming the first blade/vane row, by the injection of water, and supplying the intercooled water to the cooling air ducts of the turbine blades/vanes forming the second blade/vane row.

18. The method as claimed in claim 17, wherein, within a turbine blade/vane, a partial flow of the cooling air is branched off and mixed into the working medium by a number of cooling air outlets arranged in a region of a rear edge, relative to the flow direction of the working medium, of a blade/vane aerofoil.

\* \* \* \* \*